US009733814B1

United States Patent
Al-Ghamdi

(10) Patent No.: US 9,733,814 B1
(45) Date of Patent: Aug. 15, 2017

(54) SYSTEMS AND METHODS FOR LINKING AND DISPLAYING GEOGRAPHICALLY-RELATED INTERESTS IN A SOCIAL NETWORK

(71) Applicant: Mohammed A. G. Al-Ghamdi, Al Khobar (SA)

(72) Inventor: Mohammed A. G. Al-Ghamdi, Al Khobar (SA)

(*) Notice: Subject to any disclaimer, the term of this patent is extended or adjusted under 35 U.S.C. 154(b) by 135 days.

(21) Appl. No.: 14/643,048

(22) Filed: Mar. 10, 2015

Related U.S. Application Data

(60) Provisional application No. 61/955,288, filed on Mar. 19, 2014.

(51) Int. Cl.
| | |
|---|---|
| *H04W 4/02* | (2009.01) |
| *H04L 29/08* | (2006.01) |
| *G06F 3/0484* | (2013.01) |
| *H04L 12/58* | (2006.01) |

(52) U.S. Cl.
CPC .......... *G06F 3/04842* (2013.01); *H04L 51/32* (2013.01)

(58) Field of Classification Search
CPC .............................. G06F 3/04842; H04L 65/60
USPC ........ 709/204, 205, 206, 231; 707/723, 737, 707/748; 705/7.29, 14.53, 27.1
See application file for complete search history.

(56) References Cited

U.S. PATENT DOCUMENTS

| | | | | |
|---|---|---|---|---|
| 9,014,726 | B1* | 4/2015 | Foster | H04W 4/02 455/418 |
| 2011/0047463 | A1* | 2/2011 | Shepherd | G06Q 10/10 715/723 |
| 2015/0245168 | A1* | 8/2015 | Martin | H04W 4/02 715/751 |

OTHER PUBLICATIONS

"Measuring Social Networks with Digital Photograph Collections"—Golder et al, Hewlett-Packard Labs, Aug. 2008 http://www.hpl.hp.com/research/idl/papers/sna-photos/sna-photos-ht08-preprint.pdf.*

* cited by examiner

*Primary Examiner* — Randy Scott

(57) ABSTRACT

Systems and methods are disclosed for generating recommendations for places within a geographic area that are of interest to a user's social group, in one or more social networks, and more particularly where user interest is reflected by the posting of geo-tagged photographs of the places of interest and associated metadata. In one embodiment, an application for a mobile device presents a user with a list of geographic locations visited by one or more other users that the user follows on a social network. The user may select from the list and/or drill down to deeper levels in the list and then make a selection. Responsive to the selection, the application will retrieve from related databases identifying information for photographs associated with the selected geographic location, where the photographs were contributed by the users being followed and designated by them as being of interest, and display the identifying information. The user can then select one or more of the photographs for retrieval and display.

5 Claims, 7 Drawing Sheets

101

SYSTEMS AND METHODS FOR LINKING AND DISPLAYING GEOGRAPHICALLY-RELATED INTERESTS IN A SOCIAL NETWORK

CROSS-REFERENCE TO RELATED APPLICATION

This application claims the benefit under 35 U.S.C. Sec. 119(e) of the filing date of U.S. Prov. Pat. App. Ser. No. 61/955,288, filed Mar. 19, 2014 and incorporates by reference herein the entire disclosure thereof.

BACKGROUND OF THE DISCLOSURE

1. Technical Field

The subject technology generally relates to generating recommendations for places within a geographic area that are of interest to a user's social group, in one or more social networks, and more particularly where user interest is reflected by the posting of geo-tagged photographs of the places of interest and associated metadata.

2. Discussion of Related Art

The Instagram® service provides a social network in which users post photographs and comment on each others' postings. Such photographs may be geo-tagged and may have extensive associated metadata. Instagram provides an Application Programming Interface (API), whereby others can write clients and other applications to interact with the Instagram service.

The FourSquare® service provides a social network that allows registered users to post their location at a venue ("check-in") and connect with friends.

Instaearth™ is an application that uses the Instagram API to display a map showing photos taken by other users, shown at their geo-tagged location.

The existing applications do not filter the geographic association of information, for example, photographs, to those known that have been identified as being of interest within the user's social group.

SUMMARY OF THE DISCLOSURE

The following is a summary of the disclosed subject matter, which should not be understood as fully characterizing all of its aspects.

In one aspect, the disclosed subject matter can be embodied in a method for finding, on one or more social networks, photographs associated with specified geographic locations that were of interest to other followed users of the one or more social networks, the followed users being other users of the one or more social networks to whom the first user has chosen to be linked, comprising:

causing a client computer controlled by the first user to present to the user a list of geographic locations visited by one or more of the followed users;
  causing the client computer to select from said list of geographic locations a selected geographic location responsive to input received from the first user by the client computer;
  causing the client computer, responsive to said selection, to retrieve identifying information for photographs associated with the selected geographic location, within one or more databases accessible to computers within the one or more social networks, wherein the photographs were contributed to said databases by the one or more followed users and designated in the one or more databases as being of interest to the followed users;
  causing the client computer to display the identifying information and to accept from the first user input selecting one or more of the photographs for retrieval and display; and
  causing the client computer to retrieve and display to the first user the one or more selected photographs.

More generally, such a method for finding and displaying information of interest to a first user, associated with specified geographic locations, on one or more social networks, may comprise:

causing a client computer controlled by the first user to select a geographic location responsive to input received by the client computer;
  causing the client computer, responsive to said selection, to retrieve information associated with the geographic location, within databases accessible to computers within the one or more social networks, wherein the information was also previously identified in said databases as being of interest to one or more participants other than the first user; and
  displaying to the first user the information thereby retrieved.

In another embodiment, an application for a mobile device presents a user with a list of geographic locations visited by one or more other users that the user follows on a social network. The user may select from the list and/or drill down to deeper levels in the list (sith successively narrower selections) and then select a target location. Responsive to the selection, the application will directly or indirectly retrieve from related databases identifying information for photographs associated with the selected geographic location, where the photographs were contributed by the users being followed and designated by them as being of interest, and display the identifying information. The user can then select one or more of the photographs for retrieval and display.

At least one of the social networks may be a photo sharing network and the information comprises photographs and/or related metadata associated with the geographic locations. The first user can also add information to the one or more social networks.

Information in the social network databases can be designated by their contributors as private and not made available for displayed to the first user.

The first user may have his or her own store of information within the databases on the one or more of the social networks and have the ability to save the displayed information to said store.

The databases within one or more of the social media networks may record the visits of users at geographic locations and the displayed information may further comprise a display of information concerning such visits.

The user interface for the client computer may comprise a presentation in which a plurality of photographs may be swiped in and out of view by user touchscreen interaction. The step of selecting a geographic location may be performed by an input selection from a list. The step of selecting geographic location may be performed by an input selection from a graphical map display. The lists for selection may be nested and organized by successively decreasing geographic scope. The selected geographic locations may be similarly nested. Cities may be nested within countries. The information cataloged in such a system may be associated with categories and the information displayed may be limited by category.

Other participants in such a system may comprise businesses that are permitted to promote commercial information associated with the geographic location in exchange for economic remuneration, and the displayed information may comprise such commercial information.

The foregoing may be practiced as methods of configuring and/or using client and/or server computing or communications apparatus. The methods may be carried out by executing software recorded on articles comprising non-transient machine-readable media, or carried out by computing and/or communications apparatus on which such software has been loaded for execution.

Other aspects and advantages of the disclosed subject matter will be apparent from reading the detailed description that follows, and the accompanying drawings.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION OF CERTAIN EMBODIMENTS

Figure 1:
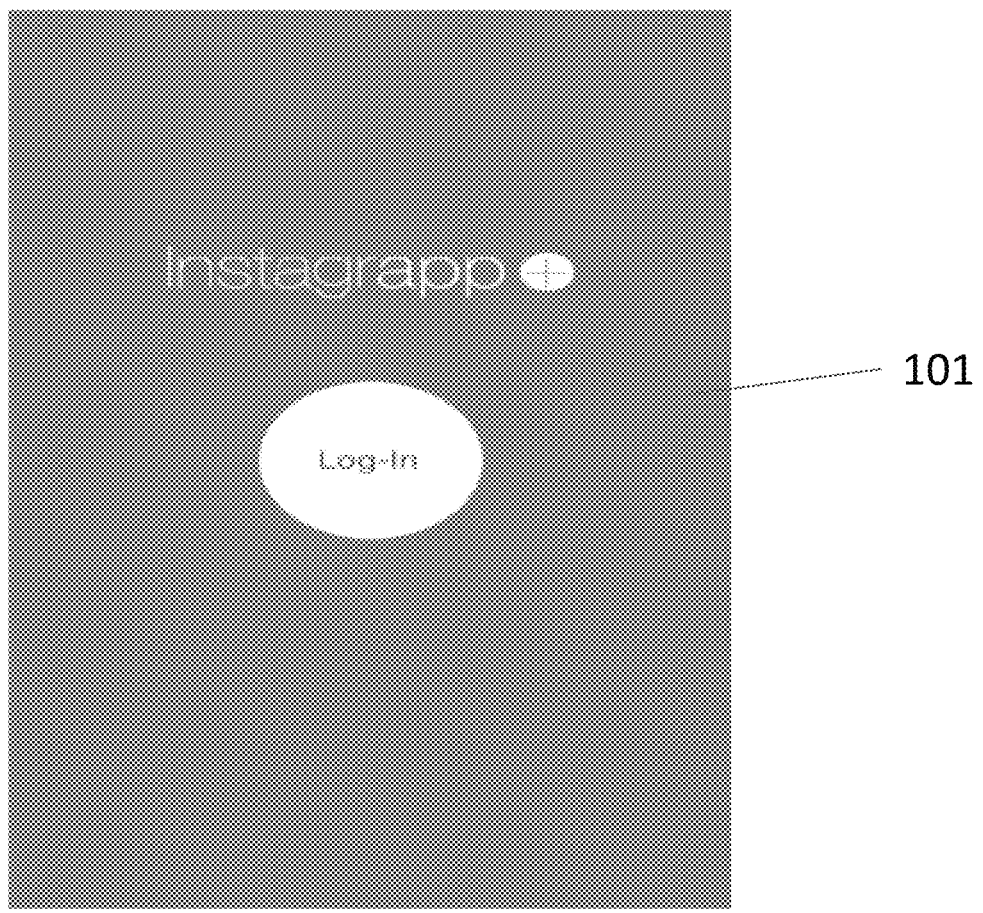
FIG. 1 shows a login screen in one embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Operating Environment and Conventions Used in this Description

The features and applications described herein may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include transient carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or processor or on multiple computers or processors that are located at one site or distributed across multiple sites and interconnected by a communication network. Such computers or processors can be physical machines or virtual machines.

The functions described herein may be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other transient or ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile or haptic feedback; and input from the user can be received in any form, including acoustic, speech, or tactile input, for example, from a touch-sensitive screen, "hard" or "soft" (on-screen) button, accelerometer, compass, camera, NFC antenna, microphone, etc. in a mobile device. A computer or mobile device may have GPS and assisted GPS capability to determine its own geographic positioning, and/or software for estimating location based on network connections. The software and apps in such devices may be made location aware. Device location may be used as metadata to tag other data such as files and photos. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server. Other protocols for such communication include, for example, JSON, AJAX, or proprietary protocols.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

Exemplary Embodiment

Ever been in a city not knowing where are the happening places? One embodiment of the present disclosure is an app for helping with this problem. Provisionally, for purposes of this description, the app is called "Instappening" (or alternately, "Whappening"), though in actual production a different name may be used. The name of the app is immaterial to the technology that it embodies, and it should be understood that where variations of "Instappening" are used herein, corresponding or different variations could be used based on such alternate app name as may be selected.

Instappening may be implemented by pulling photos from another social networking or photo storage app, transfer by email or file transfer, transfer from a computer or other device, or by using in-app photos taken with the user's camera. Instappening may also be implemented based purely on Instagram users' posts. One object is to guide users visiting countries to go to happening places their "following" (people they follow on a social network) went to by viewing pictures and their comments in that place.

One embodiment works as follows: when the app is launched, the user may log in using his/her Instagram credentials. Then a list of countries visited by the "following" are shown alphabetically (can be sorted alphabetically or by continent or most famous). Users choose a country, then a list of cities visited in that country are shown. When users choose a city, a list of categories are shown i.e. restaurant, nightclubs, museums etc. Users then choose a category, and browse through names of places the "following" went to. Users choose a place; then they can browse through pictures their friends have taken in that specific place. Alternately, the app could provide a list of, for example, four nearest places with a high score.

The app may be used to show users visiting/vacationing in a country who doesn't know where to go or where the "Happening" places are. In one embodiment, the app shows users the places based on locations of pictures posted by the "following" of users. These places and its pictures will be categorized and the organized by country.

Among the features of this embodiment may be one or more of the following:

Users can see who went to that specific place between their friends. In one embodiment, this can be achieved by adding an "I went there" feature.

Users can read, view and write comments. The comments cane be linked/synced to Instagram or other social network service.

Users can "like" pictures.

Users can add photos to their Instagram account through Instappening.

Users can opt to show private or public places. For example pictures taken in homes will not be shown; only public places will be.

Photos and videos can be viewed.

User can save pictures and videos to a photo album. (Similar to the Instagrapp+™ application).

Users can click on a certain location and it will redirect to a map app on the phone; users have the option to choose which map app on the phone to use.

Users can access their own photos and mark which ones that can be viewed in whappular. Users can go to settings and choose all photos.

Users Interaction

Apps commonly use the "Like" feature for users followers to like their posts. The more likes, the more popular. In "Instappening" the "like" system will be available but with a different wordings.

Happened will refer that the searching user went to the place posted by a following friend. Cannot do it on own photos (posts).

Happening will refer that users enjoyed the place. Which means that the place is truly a Happening place i.e. "Instappening Place".

"Instappenit" The name of the wish list if users liked a place and wants to go there whenever they can, like a short list or a quick list for "to go places".

"TapIt" Is the name of the actual liking feature for the "Instappenit" list.

Users can view one another's Instappenings. The more Instappenings on a photo (post) the better. If the user/following reached a certain Instappening number, will be named "Instappener".

Example App Mechanism

In one embodiment, the app may provide a Login screen 101 (e.g., Instagrapp+ application) (FIG. 1).

Figure 2:
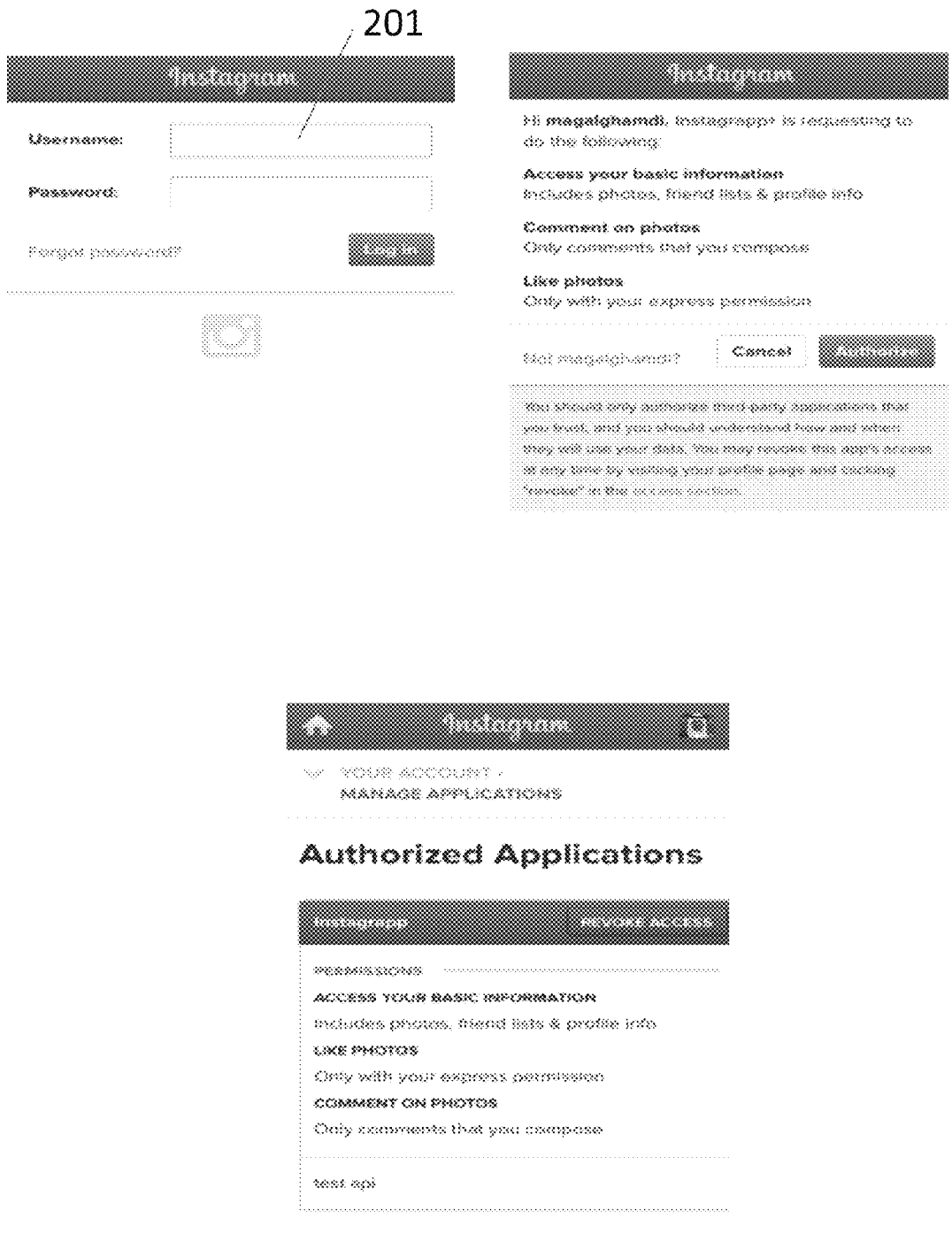
FIG. 2 shows entering credentials in one embodiment.

The app may provide a facility 201 to enter credentials (e.g., Instagrapp+ application) (FIG. 2).

Figure 3:
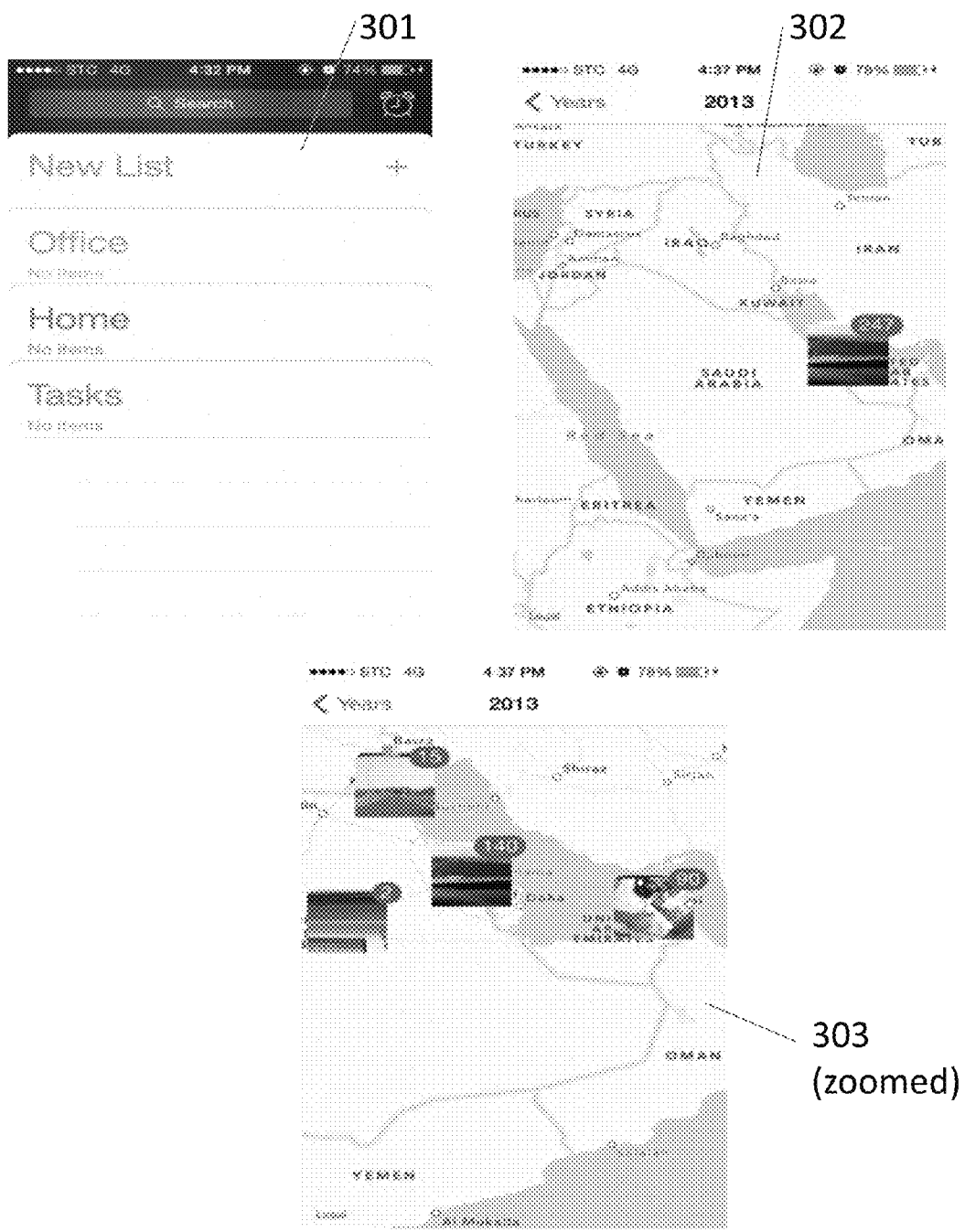
FIG. 3 shows a Countries List display in one embodiment.

The app may provide a Countries List 301 (as in a Reminders Application or a Photos Application 302, 303) (FIG. 3).

In some embodiments, the Countries List can be like the reminders application or like the photos app by geographical knowledge.

Figure 4:
FIG. 4 shows a Cities List in one embodiment.

The app may provide a Cities List 401 (as in a Weather Application) (FIG. 4).

A weather feature 402 may be added as well.

Figure 5:
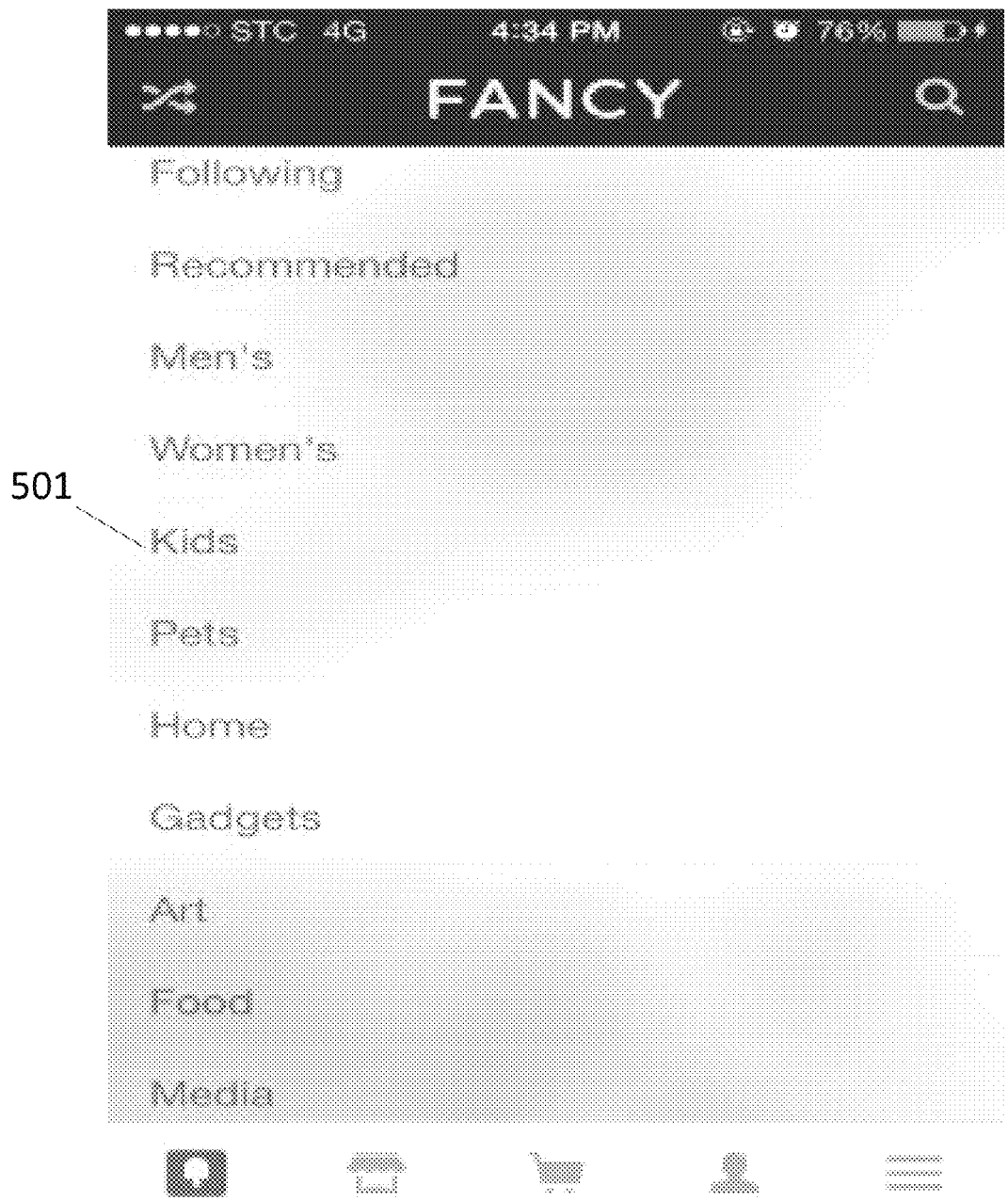
FIG. 5 shows a Categories List in an alternate embodiment.

The app may provide a Categories list 501 (e.g., in an alternate embodiment) (FIG. 5)

Categories could be identified, for example, via the Foursquare application since Instagram doesn't show categories.

Figure 6:
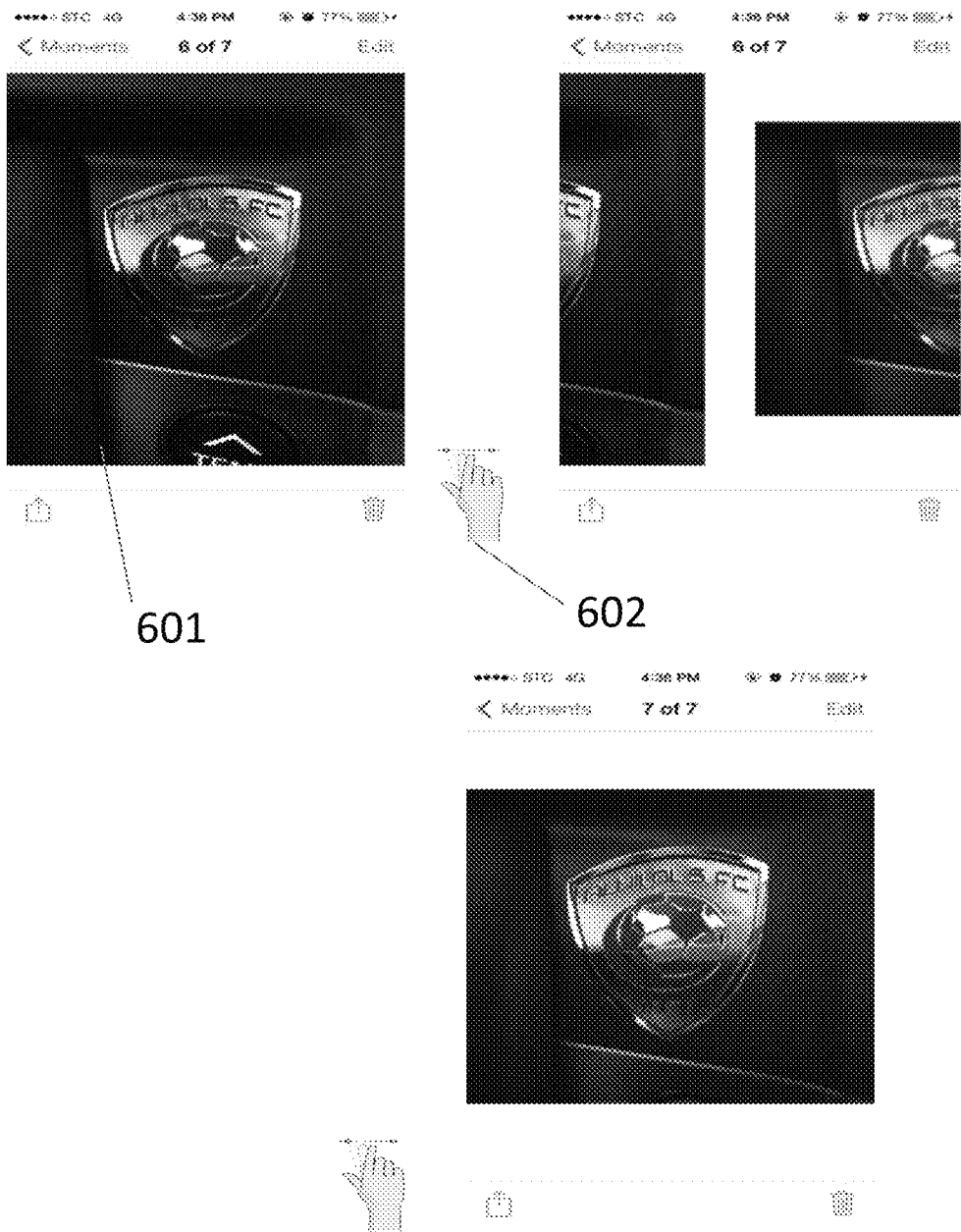
FIG. 6 shows viewing pictures by a swiping gesture in one embodiment.

FIG. 6 shows pictures viewing 601 (swiping 602), as in a Photos Application (FIG. 6).

Figure 7:
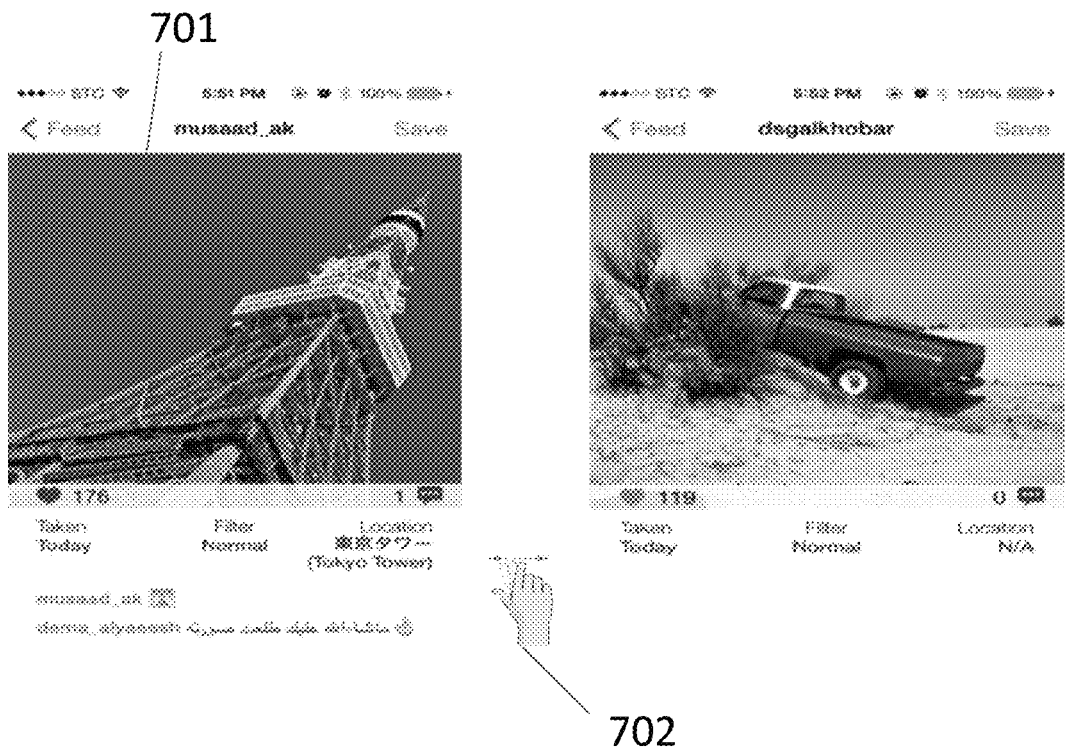
FIG. 7 shows an alternate swiping gesture.

Photos can be viewed 701 similar to as shown in FIG. 7 (as in the Instagrapp+ Application) with the same swipe feature 702 in the Photos Application (FIG. 7).

Other Aspects

B2C: Customers will buy the app from the appropriate App Store.

B2B: Promote happening business places in to our app for a certain fee.

A "challenge" can be provided in the app, similar to but different than Instagram. In Instagram Likes is the challenge that people look for to be in the popular list. However, in Whappening it will be Whapps.

Whapps is when a following person double taps on a post, which will mean that it's added to their wish list. The larger number of Whapps means a better chance to be in the Whappular (Popular) list.

Various modifications to aspects disclosed herein will be readily apparent to persons skilled in the art, and the principles described herein may be applied to other aspects. The scope of the invention supported by this disclosure should be understood as defined by the claims that follow. The claims are not intended to be limited to the aspects shown herein, but rather should be understood in accordance with the full scope of their language.

I claim:

1. A method for finding, on one or more social networks, photographs associated with specified geographic locations that were of interest to other followed users of the one or more social networks, the followed users being other users of the one or more social networks to whom a first user has chosen to be linked, the method comprising:

causing a client computer controlled by the first user to present to the first user a list of geographic locations visited by one or more of the followed users;

causing the client computer to select from said list of geographic locations a selected geographic location responsive to input received from the first user by the client computer;

causing the client computer, responsive to said selection, to retrieve identifying information for photographs associated with the selected geographic location, within one or more databases accessible to computers within the one or more social networks, wherein the photographs were contributed to said databases by the one or more followed users and designated in the one or more databases as being of interest to the followed users;

causing the client computer to display the identifying information and to accept from the first user input selecting one or more of the photographs for retrieval and display; and causing the client computer to retrieve and display to the first user the one or more selected photographs.

2. The method of claim 1, further comprising, in response to input from the first user, causing the client computer to indicate that the first user enjoyed a location corresponding to a selected photograph.

3. The method of claim 1, further comprising, in response to input from the first user, causing the client computer to indicate that the first user visited a location corresponding to a selected photograph.

4. The method of claim 1, further comprising, in response to input from the first user, causing the client computer to indicate that the first user wants to visit a location corresponding to a selected photograph.

5. The method of claim 1, wherein causing the client computer to select from said list of geographic locations a selected geographic location responsive to input received from the first user further comprises causing the client computer to use a map application to display the selected geographic location.

\* \* \* \* \*